(12) United States Patent
Shaikh

(10) Patent No.: US 9,294,918 B2
(45) Date of Patent: Mar. 22, 2016

(54) METHOD AND SYSTEM FOR SECURE REMOTE LOGIN OF A MOBILE DEVICE

(76) Inventor: Mohammed Naser S. Shaikh, Santa Barbara, CA (US)

( * ) Notice: Subject to any disclaimer, the term of this patent is extended or adjusted under 35 U.S.C. 154(b) by 462 days.

(21) Appl. No.: 12/804,098

(22) Filed: Jul. 14, 2010

(65) Prior Publication Data

US 2011/0022838 A1    Jan. 27, 2011

Related U.S. Application Data

(63) Continuation-in-part of application No. 12/508,553, filed on Jul. 23, 2009, now Pat. No. 8,613,105.

(51) Int. Cl.
     *H04L 29/06*     (2006.01)
     *H04W 12/06*    (2009.01)
     *H04L 9/32*      (2006.01)

(52) U.S. Cl.
CPC .............. *H04W 12/06* (2013.01); *H04L 9/3263* (2013.01); *H04L 63/0823* (2013.01); *H04L 63/0853* (2013.01); *H04L 2209/56* (2013.01); *H04L 2209/80* (2013.01)

(58) Field of Classification Search
CPC .............. H04L 9/3263; H04L 2209/56; H04L 2209/80; H04L 63/0823; H04L 63/0853; H04W 12/06
USPC ........................................................ 713/168
See application file for complete search history.

(56) References Cited

U.S. PATENT DOCUMENTS

| | | | |
|---|---|---|---|
| 2005/0287990 A1* | 12/2005 | Mononen et al. ............. | 455/411 |
| 2006/0235796 A1* | 10/2006 | Johnson et al. ................ | 705/44 |
| 2009/0198618 A1* | 8/2009 | Chan et al. ..................... | 705/66 |
| 2009/0271621 A1* | 10/2009 | Mendelovich et al. ........ | 713/168 |
| 2010/0311391 A1* | 12/2010 | Siu et al. ....................... | 455/411 |

* cited by examiner

*Primary Examiner* — Jeffrey Pwu
*Assistant Examiner* — Thong Truong
(74) *Attorney, Agent, or Firm* — Wilson Daniel Swayze, Jr.

(57) ABSTRACT

A system to securely login a mobile device may include a storage means for storing an encrypted file, a certification system to receive the encrypted file from the storage means, and a customer transaction system in communication with the certification system. The system may also include the mobile device to transmit the encrypted file from the storage means to the certification system to allow the mobile device to securely log into the customer transaction system.

17 Claims, 14 Drawing Sheets

METHOD AND SYSTEM FOR SECURE REMOTE LOGIN OF A MOBILE DEVICE

CROSS-REFERENCE TO RELATED APPLICATIONS

This application is a continuation-in-part of U.S. patent application Ser. No. 12/508,553, filed Jul. 23, 2009 now U.S. Pat. No. 8,613,105.

FIELD OF THE INVENTION

The present invention relates to establishing a remote connection, and, in particular, using a mobile device, a link and an encrypted file having customer login information to establish a secure connection using a mobile device.

BACKGROUND OF THE INVENTION

People use the internet to transact a variety of personal and professional business. A single customer is responsible for numerous on-line accounts that allow the customer to interact with businesses and services. Each account typically requires the customer to create or use a pre-created login identification (login ID) and/or password. Each account typically requires additional customer information, such as, for example, name, address, e-mail, credit card number, telephone number, etc. On-line accounts allow customers the ease and convenience of remotely transacting business, which saves time and money. However, these benefits are not without risk. The amount of personal information being transmitted and stored on the internet creates the ideal environment for hackers and those desiring to commit identity theft.

Confidential information has been stored on servers protected by firewalls and in databases that include established security features and security techniques. These established features have proven inadequate to prevent unauthorized access to the confidential information. Despite these known techniques, hacking and other forms of gaining unauthorized access to confidential information remain a hazard. The previous attempts remain inadequate to provide sufficient security, while efficiently completing the desired transaction and storing information related to the transaction.

Additionally, a variety of techniques have been developed to combat and minimize the potential for stolen information. Secure networks, strong logins and strong passwords, multiple levels of security, and additional login questions were all developed to help protect information. These solutions, however, present their own unique set of problems. For instance, strong logins and strong passwords are difficult to remember. This difficulty is compounded by the fact that customers tend to have a multiplicity of accounts that each require the customer to remember complex login IDs and passwords. Furthermore, to remember login information, customers write down login information, try to use the same login and password for multiple accounts, and avoid accounts that require multiple levels login authentication. These coping methods only increase the vulnerability and the probably that the customer's identity will be stolen.

Related to the problems identified above, technological advances and the increase of mobile web applications have resulted in using mobile devices to conduct personal and professional business. Mobile devices provide freedom, flexibility and versatility as never before. The internet is accessible from virtually anywhere and owners and operators of traditional web sites are creating mobile web pages to catering to the popularity of mobile devices.

Mobile devices present their own security risks regarding identity theft. Mobile devices are not able to use the sophisticated operating systems of a desktop computer and, therefore, cannot take advantage of many security features provided by modern operating systems. Additionally, the wireless transmission of data is vulnerable to interception and hackers can access confidential data resulting in catastrophic consequences. The interception of login ID's and passwords, credit card and banking records, or social security numbers are just a few examples of information that can result in identity theft.

These risks discourage and dissuade many customers from taking full advantage of the benefits and opportunities that mobile devices allow. These risks also create a cascading effect whereby businesses and services will not invest and develop technology in this area if consumers are averse to using the technology out of fear.

With the increased popularity of mobile devices and mobile web applications, new security measures and techniques are needed to safeguard and promote the use of mobile devices. What is needed to combat the problems stated above is a comprehensive solution to the problems presented by mobile devices. A customer needs to create complex login information for every account without having to tax his or her brain. There also needs to be a way to securely and remotely login and transmit data from a mobile device while safeguarding against personal information being stolen.

The previous attempts remain inadequate to provide a sufficient mobile login, while overcoming the public's aversion to the use of unique logins and creating a secure remote login and secure document exchange while using mobile devices. To achieve the goals of encouraging unique logins and establishing a remote connection from a mobile device, it is important to have a simple and efficient method of allowing a mobile device customer to register for an on-line account, distributing login credentials, and allowing a remote and secure login connection to be established. The present invention is directed to satisfying these and other needs.

SUMMARY OF THE INVENTION

Disclosed herein is a new and improved approach for a secure login using a mobile device. In accordance with an aspect of the approach, a system to securely login a mobile device may include a storage means for storing an encrypted file, a certification system to receive the encrypted file from the storage means, and a customer transaction system in communication with the certification system. The system may also include the mobile device to transmit the encrypted file from the storage means to the certification system to allow the mobile device to securely log into the customer transaction system.

In accordance with another aspect of the approach, a method for remotely connecting a mobile device may include storing an encrypted file in a storage means. The method may further include transmitting the encrypted file from the storage means to a certification system and receiving the encrypted file by the certification system. Additionally, the mobile device may be logged into a customer transaction system.

In accordance with another aspect of the approach, a method for issuing a digital certificate adapted to a mobile device may include creating an encrypted file. The method may further include creating the digital certificate it include the encrypted file and installing the digital certificate on the mobile device. Additionally, the method may include storing the encrypted file in a storage means.

The foregoing and additional aspects of the present invention will be apparent to those of ordinary skill in the art in view of the detailed description of various embodiments, which is made with reference to the drawings, a brief description of which is provided next. It is intended that all such additional systems, methods, aspects, features, embodiments and advantages be included within this description, and be within the scope of the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the apparatuses, articles of manufacture and methods disclosed herein. In the figures, like reference numerals designate corresponding parts throughout the different views.

DETAILED DESCRIPTION OF THE ILLUSTRATED EMBODIMENTS

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used herein to mean "serving as an example, instance, or illustration." Any embodiment, component or variant described herein as "exemplary" is not necessarily to be construed as preferred or advantageous over other embodiments, components or variants. All of the embodiments, components and variants described in this description are exemplary embodiments, components and variants provided to enable persons skilled in the art to make and use the invention, and not necessarily to limit the scope of legal protection afforded the appended claims.

Figure 1:
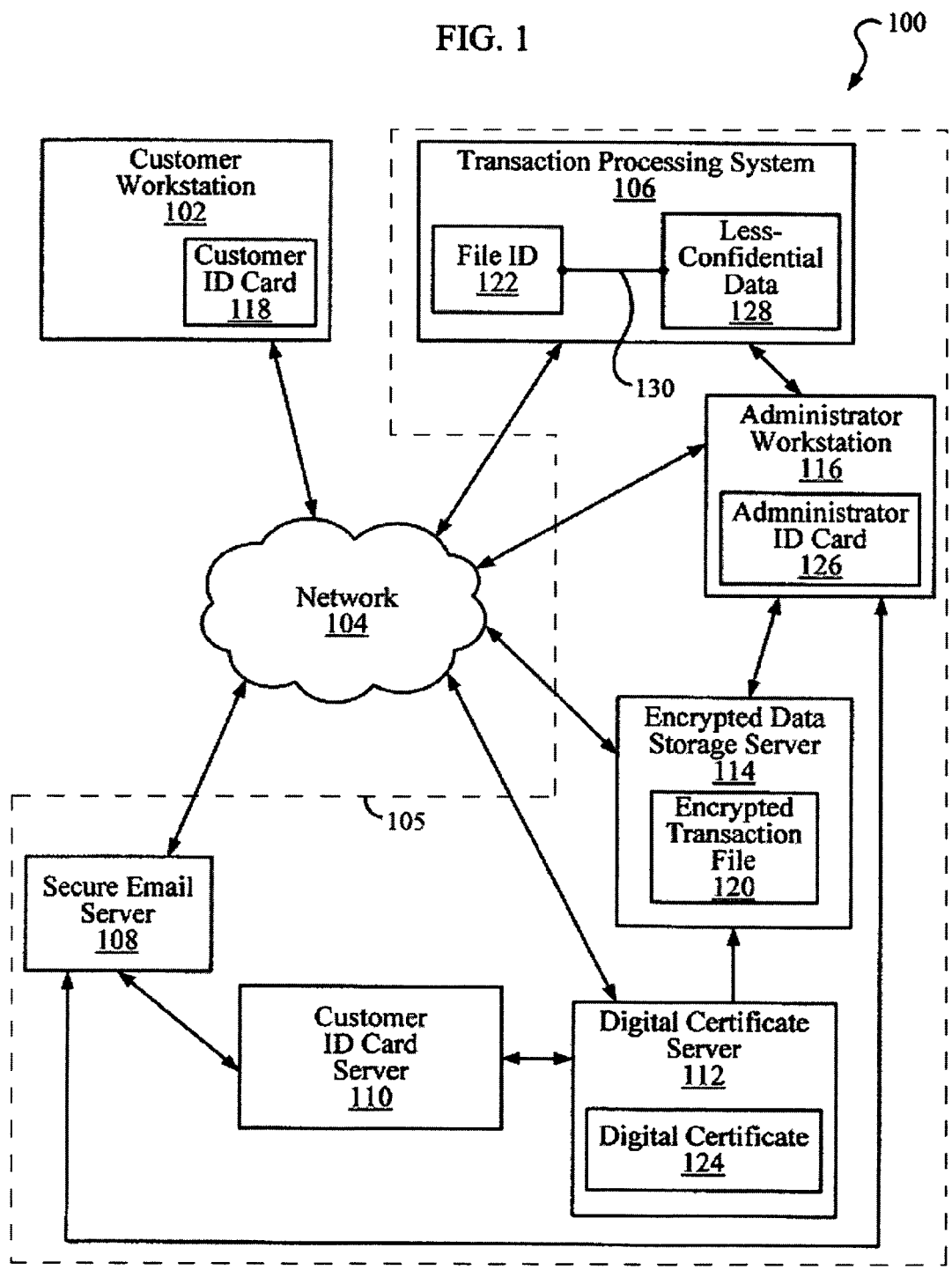
FIG. 1 is a block diagram of a system for storing information associated with a transaction.

FIG. 1 shows a functional block diagram of a secured transaction system 100 for storing confidential information associated with a transaction. System 100 includes a customer workstation 102, a network 104, a customer transaction system 105, a transaction processing system 106, a secure email server 108, a customer identification (ID) card server 110, a digital certificate server 112, an encrypted data storage server 114, and an administrator workstation 116.

Those having ordinary skill in the art generally know the hardware associated with the individual components of system 100. However, the configuration of the hardware, as illustrated herein, is new to the art. Further, in this description, though methods and processes are illustrated and disclosed with reference to system 100 components, and system 100 components are illustrated and disclosed with reference to methods and processes, the methods and processes may be practiced independently of particular components, and the components are not limited to any particular method or process. Instead, the systems, methods, and processes are as stated in the accompanying claims.

Customer workstation 102 and administrator workstation 116 may be general-purpose computers. Customer workstation 102 and administrator workstation 116 may include a combination of software and hardware, for example processor(s), input/output devices, memory element(s), and interfaces, to allow general computing activities along with interacting with network 104, transaction processing system 106, and other portions of system 100.

Customer workstation 102 and administrator workstation 116 may include software and hardware to allow icons, for example an icon associated with customer ID card 118, to be displayed on an input/output device such as a display screen. Customer workstation 102 and administrator workstation 116 may also include software and/or hardware configured to allow email interactions, including interactions with secured email server 108.

Network 104 may be a number of networks known to those having ordinary skill in the art, such as, but not limited to, a local area network (LAN), a wide area network (WAN), the Internet, an Intranet, etc. Network 104 allows interaction between various computers and communication systems, such as, but not limited to, the components of system 100 shown in FIG. 1.

Customer transaction system 105 may include transaction processing system 106, secure email server 108, customer identification (ID) card server 110, digital certificate server 112, encrypted data storage server 114, and administrator workstation 116.

Transaction processing system 106 may be a number of computer transaction processing systems used in a number of fields for processing transactions with customers or it can be hosted on network 104. Transaction processing system 106 may include a uniform resource locator (URL) configured processor, and may host the transaction website. Transaction processing system 106 may be a transaction processing system such as, but not limited to, electronic commerce transaction processing systems, credit card transaction systems, healthcare transaction processing systems, including communications between healthcare providers and patients, financial transaction processing systems, government document issuance systems, proprietary data transaction processing systems, etc. The scope of transaction data included in any particular transaction or application may include, but is not limited to, identification information, financial information, item selection information, personal health information (PHI), legal information, construction contracts and information, business contracts, passport information, driver's license information, and other proprietary and non-proprietary information. Such transaction data is often dependent upon the type of application to which the system 100 is adapted to, for example the electronic commerce transaction processing systems, credit card transaction systems, healthcare transaction processing systems, financial transaction processing systems, proprietary data transaction processing systems, etc.

Transaction processing system 106 may be configured to create encrypted transaction file 120 based on the confidential information associated with a transaction between transaction processing system 106 and customer workstation 102. Secure email server 108 may be a number of email servers known to those having ordinary skill that are configured to encrypt at least a portion of emails prior to transmission, and are configured to receive information required for uniquely encrypting emails. The secured email server 108 may also provide the customer with updates as various events occur that may be associated with a transaction, for example, as a product is shipped the secured email server 108 may send an email to the customer workstation 102. The receipt of the email may prompt the customer to request that an administrator locate and access the encrypted transaction file 120, for example, to change, verify, and/or dispute a transaction.

Customer ID card server 110 may be, for example, an infocard server or a similar server, such as those configured to operate pursuant to systems such as, but not limited to Windows CardSpace, DigitalMe, Higgins Identity Selector, etc. The customer ID card server 110 is configured to create customer ID card 118 based on digital certificate 124 and the customer registration information. For example, the customer identification card server 110 may create customer ID card 118 from the customer registration information and a public key provided by digital certificate server 112.

Digital certificate server 112 may be, for example, but not limited to, a Microsoft certificate server and other servers that generate digital certificates for customers, for example, with 128-bit encryption or 256-bit encryption, etc. Digital certificate server 112 is configured to store a plurality of digital certificates associated with a plurality of customers. Digital certificate server 112 may also be configured to provide a plurality of public keys associated, respectively, with the plurality of digital certificates. The digital certificate server 112 may provide the public key to the customer, and retain the private key for use in decrypting data stored in the encrypted data server 114. The digital certificate may be, for example, a 128-bit, or better, encryption code, as known to those having skill in the art. The private key may also be linked to the file ID 122.

Encrypted data storage server 114 may be configured to store a plurality of encrypted transaction files, such as encrypted transaction file 120. The plurality of encrypted transaction files may be associated, respectively, with a plurality of encryption keys that are required to access a respective encrypted transaction file. Encrypted data storage server 114 may also be configured to associate a plurality of file IDs, for example file ID 122, respectively with the plurality of encryption keys, such that the respective file ID is required to access the respective encrypted transaction file.

Secured transaction system 100 may generally be illustrated and described as including components configured to permit possibly three tasks, processes, and/or methods. A first process may include the issuance of a customer identification (ID) card 118 or digital certificate to allow a customer to log into a transaction processing system transaction processing system 106 using either a customer workstation 102 or a mobile device 222. A second process may include the completion of a transaction and the creation of an encrypted transaction file 120 and a file ID 122. A third process may include allowing a customer and/or an administrator access to the encrypted transaction file 120 under limited circumstances and/or conditions.

Though initially illustrated and described in regard to FIG. 1, the creation of a single customer ID card 118, a single encrypted transaction file 120, a single file ID card 122, the systems and methods are capable of creating a plurality of such components associated with a plurality of transactions by a plurality of customers, and may be used by a plurality of administrators. Further, although illustrated and described with a separate customer workstation 102 and administrator workstation 116, in some applications, the customer and the administrator may be the same. For example, in some embodiments, a customer/patient may provide confidential information during a transaction involving a healthcare provider. At a later time, it may be the customer/patient, the administrator/healthcare provider, and an agent of either, that may wish to access the confidential information stored pursuant to the technology disclosed herein. In additional embodiments and applications, customers and/or agents may include, but are not limited to, immigration officers, airline staff, customs official, and agent of customers and administrators, that may wish to access the confidential information stored pursuant to the technology disclosed herein.

Figure 2:
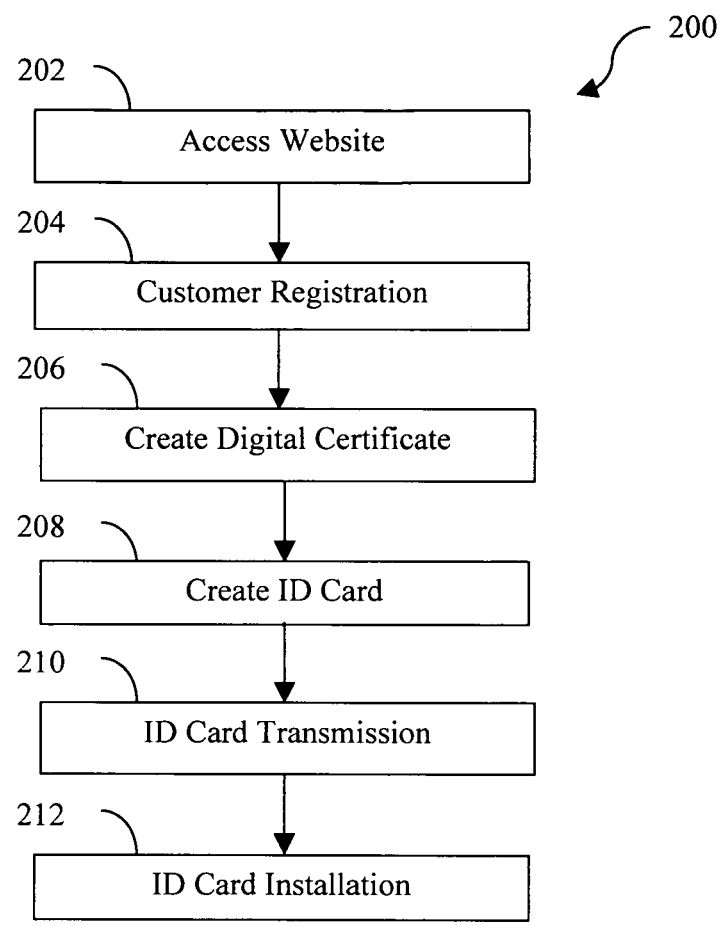
FIG. 2 is a flowchart illustrating a method of issuing a customer identification (ID) card.

FIG. 2 shows flowchart 200 illustrating a method of issuing a customer ID card, including an access website block 202, a customer registration block 204, a digital certificate creation block 206, an ID card creation block 208, an ID card transmission block 210, and an ID card installation block 212. In access website block 202, a customer may access a transaction website associated with transaction processing system 106. The transaction website may be configured to accept customer registration information. Customer registration information may include information associated with the customer that may be used to identify the customer and/or to facility anticipated transactions in which the customer may engage, such as but not limited to, the customer's first name, middle name, last name, business name, email address, home address, email address, credit card information, the credit card codes, bank account information, zip code, or any other information useful in accomplishing anticipated transactions.

In customer registration block 204, the customer may provide the customer registration information through conventional means of website computer data entry. The type of customer may depend upon the particular function of the transaction processing system 106. For example, in some applications the customer may be a purchaser, in other applications, the customer may be a patient, a physician, a legal professional, a financial professional, etc. The customer registration information may be included and/or converted into a customer registration information file that may be transmitted to digital certificate server 112 and/or transaction processing system 106. In some embodiments, an administrator may be informed, for example through secured email server 108 and administrator workstation 116, that the customer is attempting to acquire customer ID card 118. The administer, and/or algorithms associated with administrator workstation 116, may prevent the issuance of customer ID card 118 if issuance criteria are not met, such as if the identity of the customer cannot be confirmed.

In digital certificate creation block 206, digital certificate server 112 may create a digital certificate 124 based upon the registration information file. Digital certificate 124 may be designed to be a unique, or practically unique code. For example, digital certificate server 124 may be configured to generate public and private keys based upon public key infrastructure (PKI) based encryption techniques.

In ID creation block 208, customer ID card server 110, for example a Microsoft windows cardfile personal information manager, may create customer ID card 118, for example as a CRD file. Customer ID card 118 may be an encrypted security file that stores secure certificates used to authenticate a person or device, such as a computer or Web server. Customer ID card 118 may require a password to be opened and may be installed through in a variety of manners, such as but not limited to, a right-click and selection. Customer ID card 118 may include digital certificate 124 and the customer registration information, and/or a subset of information associated with digital certificate 124 and the customer registration information. Customer ID card 118 may be designed to be a unique, or practically unique, code designed to identify the customer, and/or customer workstation 102. In some embodiments, an administrator may have to approve the issuance of customer ID card 118.

In ID card transmission block 210, customer ID card 118 may be transmitted to customer workstation 102 via an email server, for example secured email server 108, and via network 104. Suitable formats for such cards and certificates include, but are not limited to, ".crd" and ".pfx". In ID card installation block 212, the customer ID card 118 may be installed on customer workstation 102, for example, as an icon configured to cooperate with the transaction website and/or transaction processing system 106.

Once issued customer ID card 118, a customer may log into transaction processing system 106, for example, through the transaction website. Referring to FIG. 1, a customer may be able to click on, right click and select, and/or drag-and-drop, an icon associated with customer ID card 118 that establishes a link between customer workstation 102 and transaction processing system 106. Transaction processing system 106 may be configured to uniquely, or practically uniquely, associate customer workstation 102 with customer ID card 118, such as in infocard, as known to those having skill in the art.

Figure 3:
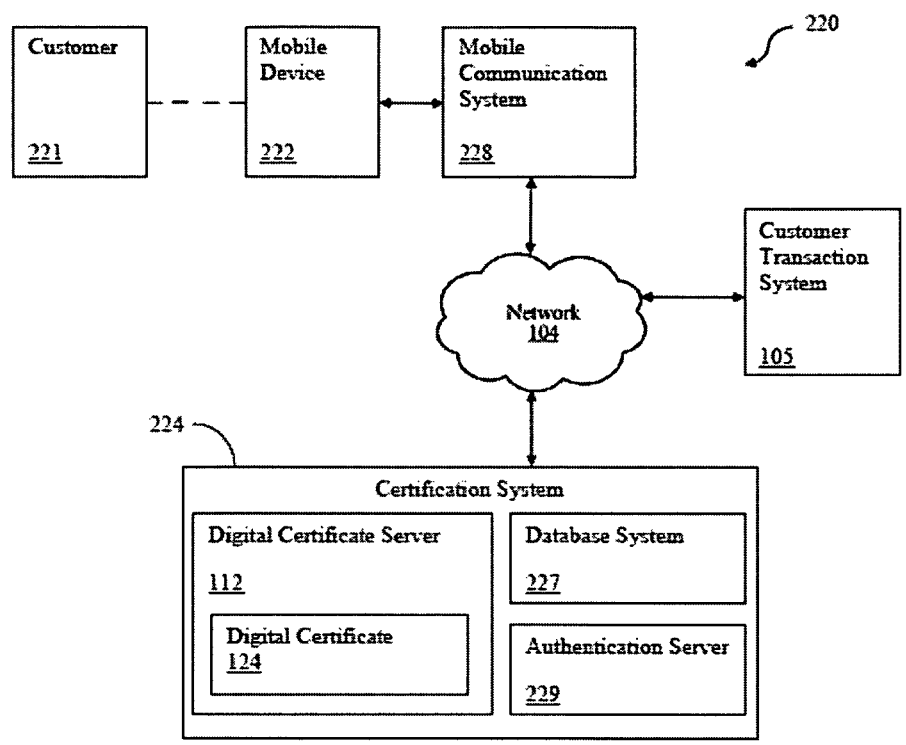
FIG. 3 is a block diagram of a system for secure login associated with a transaction using a mobile device.

FIG. 3 is a simplified block diagram of an embodiment of a secured login system 220 allowing a mobile device 222, rather than customer workstation 102, to connect to customer transaction system 105. Secured login system 220 may include a customer 221, a mobile device 222, network 104, a certification system 224, customer transaction system 105, and a mobile communication system 228. Secured login system 220 allows mobile device 222 to securely connect to customer transaction system 105 and carry out secured transactions. Certification system 224 may include digital certificate server 112, an authentication server 229 and a database system 227.

Customer 221 may include a person or individual to operate mobile device 222.

Mobile device 222 may include, but is not limited to, cellular telephones, mobile phones, satellite phones, remote compute engines, mobile platforms and all equivalents. Mobile device 222 does not possess the operating system of customer workstation 102 and, therefore, it is impractical to utilize customer ID card 118 to log into customer transaction system 105. Thus, an alternative system and method are required to allow mobile device 222 to connect to customer transaction system 105 and utilize system 100.

Customer transaction system 105 may be one of a number of computer transaction systems used in a number of fields for processing business or personal transactions with customer 221. Customer transaction system 105 may allow an account to be created and store customer information to complete transactions with customer transaction system 105. Customer transaction system 105 may include a uniform resource locator (URL) configured processor, and may host a transaction website. Customer transaction system 105 may take many forms and the scope of transaction data included in any particular transaction or application may depend upon the type of application to which system 100 is adapted.

As stated previously, network 104 may be a number of networks known to those having ordinary skill in the art, such as, but not limited to, a local area network (LAN), a wide area network (WAN), the Internet, an Intranet, etc. Network 104 may allow interaction between various computer, servers, and systems, such as, but not limited to, the components of system 100 shown in FIG. 3.

Mobile communication system 228 may provide service to and allow mobile device 222 to operate through a cell site or a transmitting tower. Mobile communication system 228 may communicate with mobile devices via ground-based cellular towers or by way of satellite. Cell sites may be connected to telephone exchanges, or switches, which may allow data or information to be transferred over networks, such as network 104 identified above.

Certification system 224 may include digital certificate server 112, authentication server 229 and database system 227. Database system 227 may be capable of storing multiple data elements related to the customer's login information and other data elements needed to conduct a transaction. Database system 227 may also store transaction request information when customer transaction system 105 receives login information from digital certificate server 112 and may record the transfer of files and data back and forth between customer transaction system 105 and mobile device 222.

Digital certificate server 112 may generate a unique digital certificate that is associated with a customer transaction system account and can encrypt and decrypt login information. Digital certificate server 112 may be, for example, but not limited to, a Microsoft certificate server and other servers that generate digital certificates for customers, for example, with 128-bit encryption or 256-bit encryption, etc. Digital certificate server 112 may be configured to store a plurality of digital certificates associated with a plurality of customers. Digital certificate server 112 may also be configured to provide a plurality of public keys associated, respectively, with the plurality of digital certificates. The digital certificate server 112 may also conform to public key infrastructure (PKI) as required by Federal and State Electronic signature statute and allow encrypting of data or documents. Digital certificate server 112 may create an executable file that stores an encrypted file to be stored on a computer-readable medium and may store a link that allows mobile device 222 to connect with digital certificate server 112.

Authentication server 229 may be configured to authenticate login information extracted from a decrypted file or otherwise received by certification system 224 with information stored in database system 227. The authentication server 229 may authenticate the extracted login information by referencing the login information stored in database system 227.

The operation of secured login system 220 may include the issuance of digital certificate 124 to customer 221, i.e., the user of mobile device 222, from digital certificate server 112 and the secure login of mobile device 222 using digital certificate 124.

Figure 4:
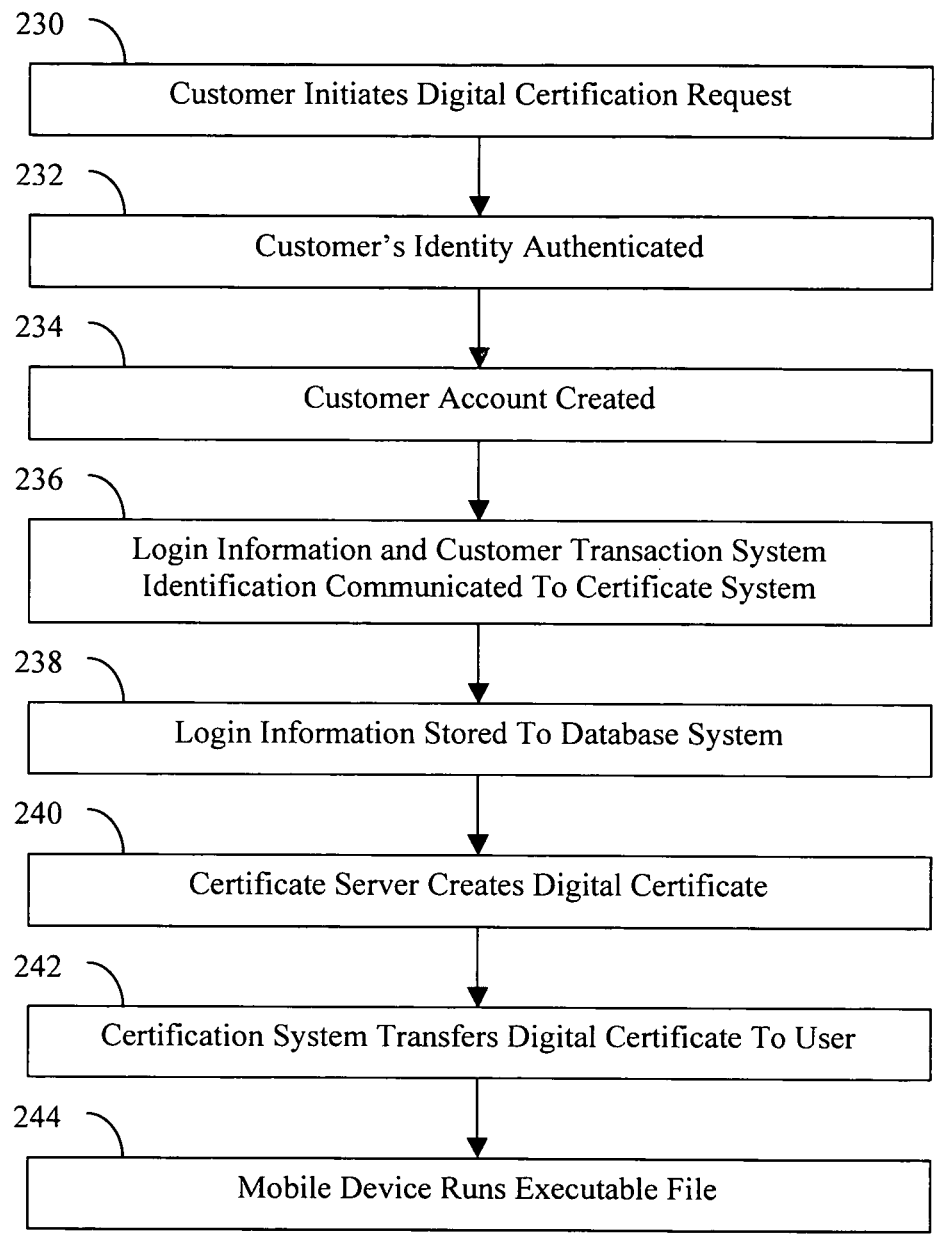
FIG. 4 is a flowchart illustrating a method of issuing a digital certificate to the customer's mobile device.

The flow chart in FIG. 4 shows how digital certificate 124 may be issued to mobile device 222. In step 230, customer 221 may request digital certificate 124 from customer transaction system 105 for securely connecting to customer transaction system 105 from mobile device 222. In step 232, customer transaction system 105 may authenticate the customer's identity. In step 234, customer 221 may create an account with customer transaction system 105. In step 236, customer transaction system 105 may communicate login information for customer 221 to certification system 224. In step 238, certification system 224 may store login information and transaction system identification in database system 227. In step 240, digital certificate server 112 may create a digital certificate 124. In step 242, digital certificate server 112 may transfer the digital certificate 124 to mobile device 222. In step 244, an executable file may be executed on mobile device 222 to store an encrypted file and install a link to digital certificate server 112. The steps can be performed in various orders or multiple steps may be performed simultaneously and no specific amount of time is required between any two steps or combination of steps. The above identified steps are expounded upon in greater detail below.

In step 230 of FIG. 4, customer 221 may request a digital certificate 124 from customer transaction system 105 for securely connecting to customer transaction system 105 from mobile device 222. Customer 221 who desires to perform transactions with customer transaction system 105 via mobile device 222 may initiate the process to have the digital certificate 124 issued for mobile device 222.

In step 232 of FIG. 4, customer transaction system 105 may authenticate customer's identity. The authenticated identity of customer 221 may ensure and minimize the risk that digital certificate 124 is not being obtained by fraud and is issued to the correct person. The authentication of customer's identity may be performed by an authenticating agent, such as, but not limited to, the owner, operator or an agent of customer transaction system 105, a third party hired by the owner of customer transaction system 105, a notary public, a state or federal agency employee such as a county clerk, or any equivalent. The authentication may be performed in person and allow for the physical inspection of identification documents. Ultimately the level of authentication may vary depending upon the level of authentication deemed necessary by the owners or operators of the various systems involved in secured login system 220. In fact, additional levels of authentication may be required in some circumstances that would re-authenticate customer's identity, as well as, perform a background check.

Figure 5:
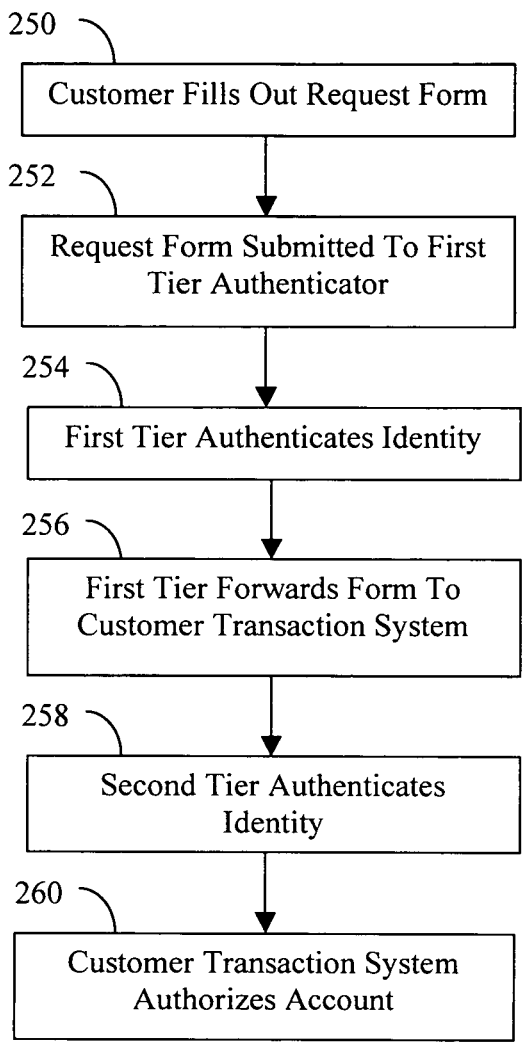
FIG. 5 is a flowchart illustrating a method of authenticating the customer's identity.

Referring to FIG. 5, a flow chart is depicted representing one embodiment in which customer's identity may be authenticated using a two tier approach to authentication. In step 250, customer 221 may fill out a request form provided by customer transaction system 105 to begin the identification authentication process. The form may require information relevant for authenticating customer's identity such as, but not limited to, name, address, social security number, marital status, bank account information, blood type, biometric data, credit card information, or other information.

Upon completion of the form, customer 221 may submit the form to a first tier authenticator in step 252. The first level of authentication may be performed by a trusted authority such as, but not limited to, a County Clerk, a County Recorder, a County Auditor, a notary, or any equivalent authenticator. In addition to submitting the form, customer 221 may also be required to present one or more forms of identification such as, but not limited to, a driver's license, a passport, a social security card, a state ID card, a military ID, a birth certificate, or any equivalent identification.

In step 254, the trusted authority may authenticate information relevant for authenticating the customer's identity. The trusted authority may use the request form and any required forms of identification to authenticate customer's identity.

Upon proper authentication, in step 256, the trusted authority may process the registration form and forward it to customer transaction system 105. To process the authenticated registration form, the trusted authority may indicate approval by means of, such as, but not limited to, fixing a seal, signing the registration form, or any equivalent form of authentication. The processed registration form may be forwarded in a secure manner to the owner, operator, or agent of customer transaction system 105 to ensure that the form will not be tampered with. Secure transmission of the form may include, but is not limited to, mail, courier, e-mail, through a secure connection between with authenticating agent and customer transaction system 105, or any equivalent form of transmission.

In step 258, a second tier of authentication may be implemented. At the second tier, a second authentication officer such as, but not limited to, an agent of customer transaction system 105, may authenticate the accuracy of customer's address by a different method than that used by the trusted authority in the first tier. The different method of authentication may include, but is not limited to, conducting a credit card transaction to authenticate that customer's address on the registration form corresponds with the address provided from a credit card company to the second authentication officer.

In step 260, upon authentication at the second tier, customer transaction system 105 may authorize an account associated with customer 221 to be issued a secure login. At this point, the processed and authenticated registration form may be stored securely on behalf of the owner or operator of customer transaction system 105. The process of authenticating customer's identity may be performed prior to the issuance of digital certificate 124 and may be required to be performed periodically.

If at any point customer's identity is not authenticated during the process described above in relation to FIG. 5, authorization for customer 221 to receive the digital certificate 124 may be denied.

Referring back to FIG. 4, in step 234, customer 221 may create an account with customer transaction system 105. As part of creating the account, customer 221 may provide login information for allowing customer 221 to log into an account and customer information pertinent to the nature of customer transaction system 105. Customer 221 may provide the customer information and login information through conventional means of website computer data entry, submitting a form having such information, dictating information over a telephone, or any equivalent means.

Login information for allowing customer 221 to log into an account may include, but is not limited to, login identification, a password, mobile device identification, biometric identification data, or any equivalent information. Login information may be generated by customer transaction system 105, provided by customer 221, or be a combined creation of customer transaction system 105 and customer 221. If the login information includes a login ID and password, the login ID and password may be a strong login and strong password to ensure a high level of security. A strong login ID may include at least eight characters including at least one capital letter, one lower case letter, one number, and one special character. Additional requirements may be made of a login ID or password that prohibit the use or inclusion of information related to customer 221 such as, but not limited to, customer's name, address, birthday, etc. The login information required for a given customer transaction system 105 may depend upon what the owner or operator of customer transaction system 105. Customer transaction system 105 may be owned or operated by a variety of different individuals or entities.

Customer information pertinent to the nature of customer transaction system 105 may include information to facilitate anticipated transactions in which customer 221 may engage, such as, but not limited to, customer's first name, middle name, last name, business name, e-mail address, home address, credit care information, the credit card codes, bank account information, zip code, or any equivalent information useful in accomplishing anticipated transactions.

The creation of the customer account may take place prior to customer's identification being authenticated. If the account is created prior to authentication, account information may be confirmed and additional information, such as login information, may be required for issuance of the digital certificate 124.

In step 236, customer transaction system 105 may communicate login information to certification system 224. The communication of login information may be accompanied by the inclusion of customer transaction system identification for identifying customer transaction system 105 sending the login information.

In step 238, certification system 224 may store the customer login information and customer transaction system identification in database system 227.

In step 240, digital certificate server 112 may create digital certificate 124. The digital certificate may include least two files. The first file may be an encrypted file that may include the customer's login information. Digital certificate server 112 may create the encrypted file. The encrypted file may also include the customer transaction system identification. As stated above, the digital certificate may conform to public key infrastructure (PKI) as required by Federal and State Electronic signature statute and allows encrypting of data and documents. Digital certificate server 112 may create an encrypted file using the certificate server's public key. The second file may be an executable file to be run on mobile device 222. In some instances, digital certificate 124 may include the issuance of a public key for encrypting and decrypting files transferred between mobile device 222 and digital certificate server 112.

In step 242, digital certificate server 112 may transfer the digital certificate 124 to mobile device 222. The modes for transferring the digital certificate 124 to mobile device 222 may include, but are not limited to, e-mail, text message, direct connection, or any equivalent mode.

In step 244, the executable file of digital certificate 124 may be run on mobile device 222. When the executable file runs on mobile device 222, the executable file may store the encrypted file in a computer-readable medium and may install a link to digital certificate server 112 on mobile device 222. The computer-readable medium for storing the encrypted file may include, but is not limited to, memory of mobile device 222, a SIM card, a compact flash memory card, a secure digital (SD) card, miniSD memory card, microSD memory card, memory stick, multimedia card, a smart card, an external memory device such as a USB drive or a thumb drive, a memory location on network 104 such as a server, or any equivalent computer-readable medium for storing a file. Memory of mobile device 222 may further be identified as RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor.

The link for connecting to digital certificate server 112 may include, but is not limited to, an icon, a file stored on a computer-readable medium, or any equivalent link. If the link includes an icon, the icon may be displayed on an input/output portion of mobile device 222 and the input/output portion may include, but is not limited to, a display, touch screen, monitor, or equivalent for representing the icon. In cases where the link is a file stored on a computer-readable medium, a computer-readable medium as described above in relation to storing the encrypted file may be acceptable. In cases where the digital certificate may also include a public key, the executable file may store the public key in a computer-readable medium as previously described. Once the installation is complete, mobile device 222 may then create a secure connection with digital certificate server 112.

Figure 6:
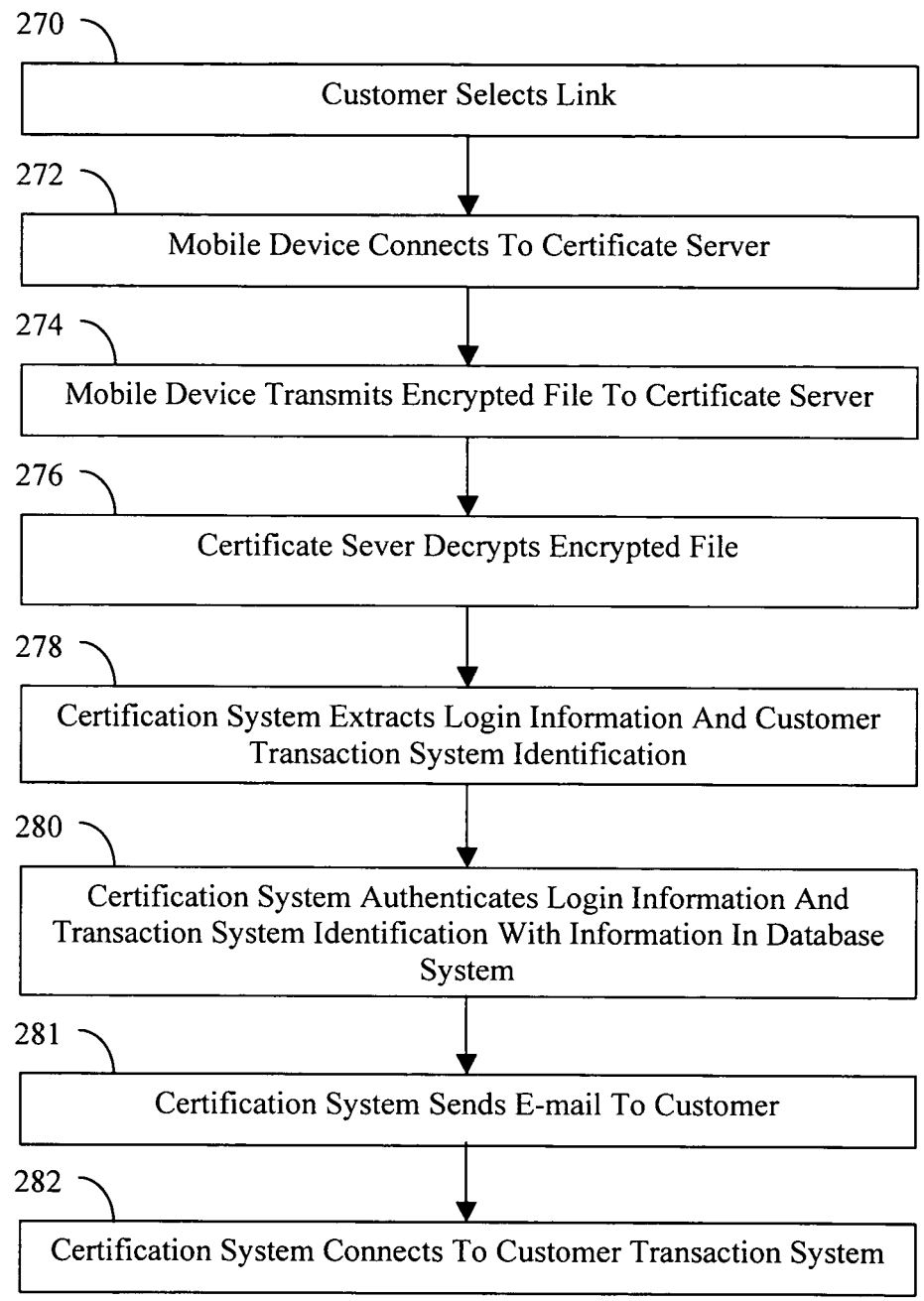
FIG. 6 is a flowchart illustrating a method of creating a secure connection between the customer's mobile device and a customer transaction system.

The flowchart in FIG. 6 shows how mobile device 222 may securely connect to customer transaction system 105. In step 270, the link previously installed on mobile device 222 may be selected. In step 272, mobile device 222 may connect to digital certificate server 112 via mobile communication system 228. In step 274, mobile device 222 may transmit the encrypted file stored on a computer-readable medium to digital certificate server 112. In step 276, digital certificate server 112 may decrypt the encrypted file using its private key to access the login information in the encrypted file. In step 278, certification system 224 may extract information from the decrypted file. In step 280, authentication server 229 may authenticate the login information extracted from the decrypted file with the login information stored in database system 227. In step 281, upon a successful authentication, certification system 224 may notify customer 221 indicating that a secure login from mobile device 222 is occurring. Notification may include, but is not limited to, sending an e-mail, sending a text message, paging, faxing, sending a letter, or any equivalent for of notification. In step 282, certification system 224 may connect to customer transaction system 105 and transfer the login information to customer transaction system 105. The communication of information and data between certification system 224 and customer transaction system 105 may be secure and employ encryption and decryption methods. The receipt of the login information by customer transaction system 105 may constitute a secure remote login by mobile device 222 with customer transaction system 105, thus creating a connection between mobile device 222 and customer transaction system 105.

Once a connection is established between mobile device 222 and customer transaction system 105, data and documents may be securely transmitted and received between mobile device 222 and customer transaction system 105 utilizing the PKI of digital certificate server 112.

The above described system and methods will now be described by way of an exemplary embodiment. Customer 221 may desire to use mobile device 222 to perform online banking with customer transaction system 105, which is a financial institution. The financial institution operates a mobile web page that would allow customer 221 to perform on-line transactions once the customer's identity is authenticated and customer 221 is issued a digital certificate 124. To authenticate the customer's identity, the financial institution mails customer 221 an identification registration form.

Customer 221 receives the form, fills out the form, and is required to take the form along with a passport to the County Clerk. The County Clerk receives the completed form and authenticates the customer's identity by examining the customer's passport. Upon a proper authentication, the County Clerk places a seal on the registration form and mails the registration form to the financial institution.

The financial institution receives the authenticated form the County Clerk and authorizes customer 221 to obtain a mobile web account. The financial institution creates login information including a login ID and password for customer 221. The financial institution then sends to certification system 224 the login information and a transaction system identification to identify the mobile web page of the financial institution. Certification system 224 saves the login information in database system 227. Digital certificate server 112 may create digital certificate 124 that may include an executable file and an encrypted file of the login information previously stored in database 227. Once digital certificate 124 is created, digital certificate server 112 sends digital certificate 124 to mobile device 222 via mobile communication system 228.

Customer 221 receives digital certificate 124 on mobile device 222 and the executable file may be immediately run. The executable file stores the encrypted file in the memory of mobile device 222 and installs a link in the form of an icon on the display of mobile device 222. The icon operates to connect mobile device 222 to digital certificate server 112 and send the encrypted file from the memory of mobile device 222 to digital certificate server 112. Mobile device 222 is then ready for customer 221 to securely log into the financial institution's mobile web page via mobile device 222.

To log into the financial institution's mobile web page, customer 221 selects the link on the display of mobile device 222. Mobile device 222 connects to digital certificate server 112 and sends the encrypted file from the memory of mobile device 222 to digital certificate server 112.

Digital certificate server 112 receives the encrypted file, decrypts the encrypted file, and extracts the login information and transaction system from the decrypted file. Authentication server 229 then compares the extracted login information by referencing the login information stored in database system 227. Upon a successful authentication by authentication server 229, certification system 4 will connect to the mobile web page of the financial institution as indicated by the customer transaction system identification.

Once certification system 224 is connected to the mobile web page of the financial institution, certification system 224 sends the extracted login information to mobile web page of the financial institution. Upon receipt of the login information, the financial institution is able to login customer 221 into the customer's online banking account via the financial institution's mobile web page. When customer 221 is logged in, customer 221 can perform any online banking customer 221 desires such as checking his balance or transferring money.

Figure 7:
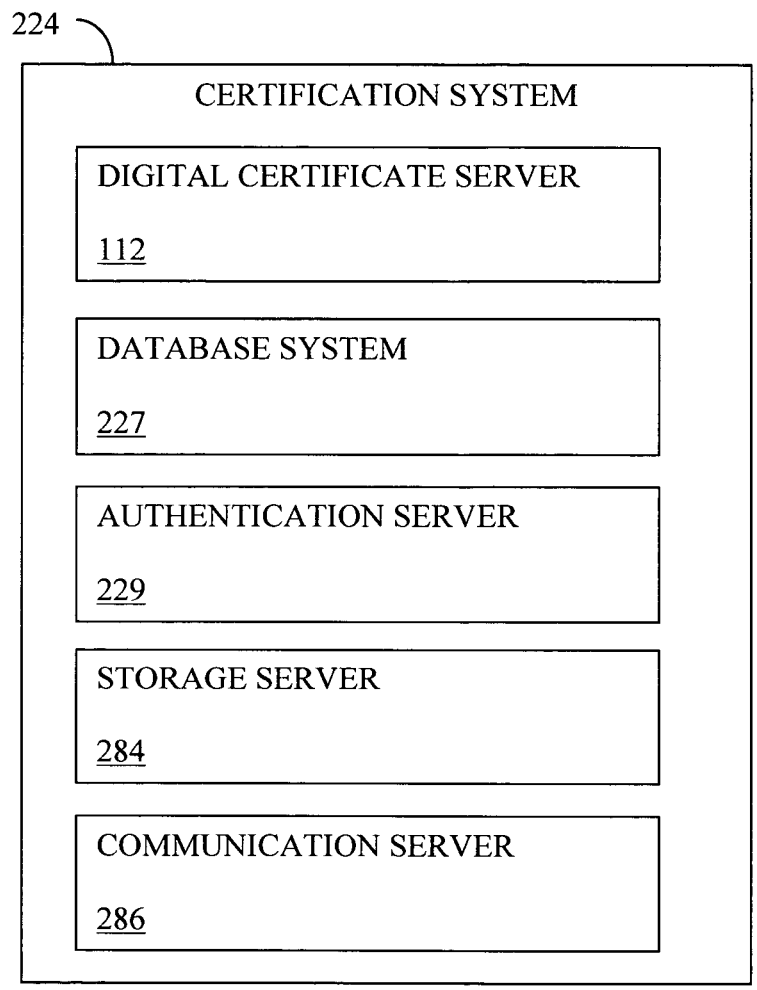
FIG. 7 is a block diagram of an embodiment of a certification system.

FIG. 7 shows an additional embodiment of certification system 224. In this embodiment, certification system 224 may include, but is not limited to, digital certificate server 112, database system 227, authentication server 229, communication server 286 and a storage server 284. Storage server 284 may record transaction information when digital certificate server 112 decrypts data or a file exchanged between mobile device 222 and customer transaction system 105. Storage server 286 may save part of or all its information in an encrypted format. Transaction information may include, but is not limited to, information related to date, time, mobile device identification, transaction system identification, and any equivalent information to record an individual transaction. Communication server 286 may be adapted to notify customer 221 any time data or information is transmitted between mobile device 222 and digital certificate server 112. Notification by communication server 286 may include, but is not limited to, sending an e-mail, sending a text message, paging, faxing, sending a letter, or any equivalent form of notification.

The previous exemplary embodiment wherein customer 221 uses mobile device 222 to log into a financial institution may be modified to incorporate communication server 286 and storage server 284 as described in FIG. 7. By incorporating communication server 286 into certification system 224, communication server 286 is able to notify customer 221 each time a login is attempted. In doing so, customer 221 will know if a third party is attempting to access his or her account. By incorporating storage server 284 into the certification system 224, storage server 284 is able to record the date, time and nature of every transaction customer 221 makes with the financial institution once customer 221 is logged into his online mobile account. If customer 221 ever believes that that an error was made during a transaction with the financial institution while using mobile device 222, the stored information in storage server 284 may be consulted to settle the dispute.

Figure 8:
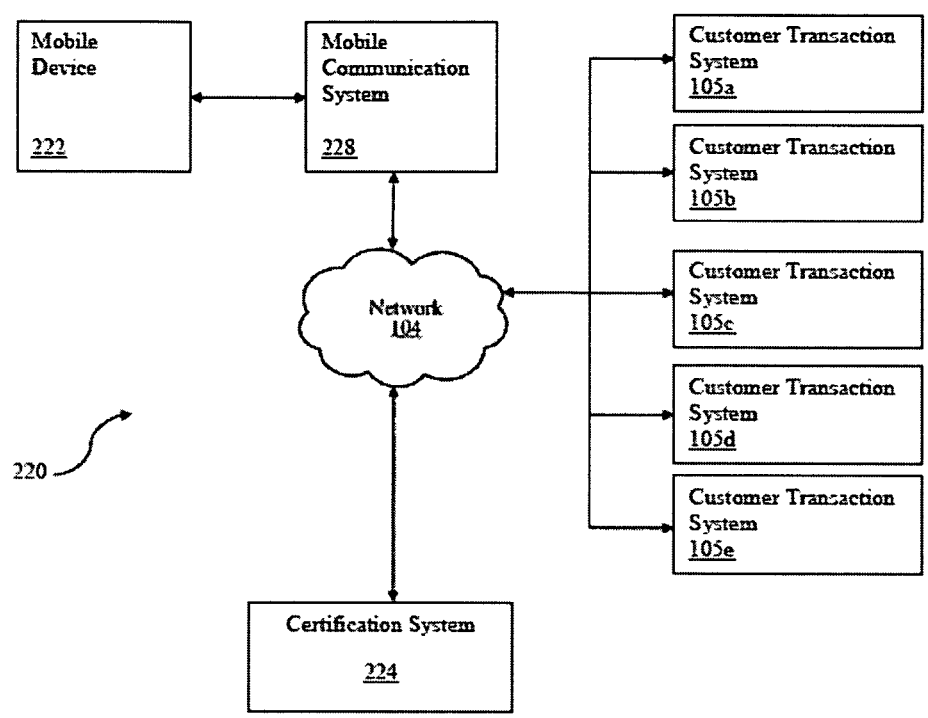
FIG. 8 is a block diagram of a system for secure login associated with a transaction using a mobile device and having multiple customer transaction systems.

FIG. 8 is a simplified block diagram of an embodiment of secured login system 220. Secured login system 220 may include mobile device 222, network 104, certification system 224, a plurality of customer transaction system 105a, 105b, 105c, 105d and 105e, and mobile communication system 228.

Mobile device 222 may be issued digital certificate 124 from each customer transaction system 105a, 105b, 105c, 105d and 105e. Each customer transaction system 105a, 105b, 105c, 105d and 105e may send login information and a transaction system identification to certification system 224 to allow mobile device 222 to log into the customer's account of the respective customer transaction system 105a, 105b, 105c, 105d and 105e. Digital certificate server 112 may then create a digital certificate 124 corresponding to each customer transaction system 105a, 105b, 105c, 105d and 105e and send each digital certificate 124 to mobile device 222. Upon receipt of each digital certificate, mobile device 222 may install a link and store an encrypted file corresponding to each customer transaction system 105a, 105b, 105c, 105d and 105e. Mobile device 222 may then log into a given customer transaction system 105a, 105b, 105c, 105d and 105e by way of customer 221 simply selecting the appropriate link on mobile device 222. Mobile device 222 may then log into the desired customer transaction system 105a, 105b, 105c, 105d and 105e.

By way of an exemplary embodiment, an example of the embodiment as described in FIG. 8 is provided. If customer 221 desires to perform online transactions with three different customer transaction system 105 using the customer's mobile device 222. The three customer transaction systems 105 include a financial institution, an insurance company, and a bookstore. The financial institution, insurance company, bookstore each authorizes the issuance of an account and communicates the necessary information to certification system 224 to issue a digital certificate 124 for each respective customer transaction system 105. Mobile device 222 receives all three digital certificates and ends up with a separate link and encrypted file for the financial institution, the insurance company, and the bookstore. Customer 221 is then able to select the appropriate link to login with the corresponding customer transaction system 105 using the methods and systems described above.

Figure 9:
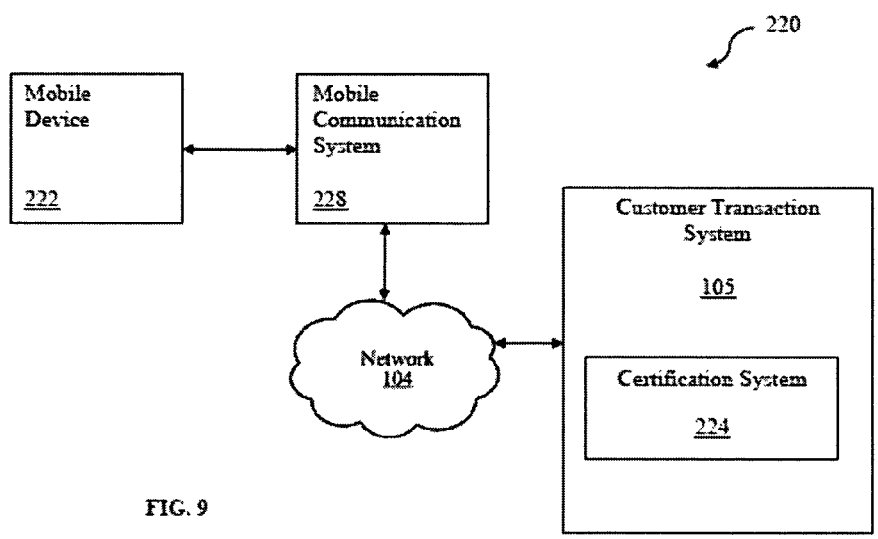
FIG. 9 is a is a block diagram of a system for secure login where the certification system is part of the customer transaction system.

FIG. 9 is a block diagram of secure login system 220 where certification system 224 may be part of customer transaction system 105. It should also be understood that portions and individual elements of the certificate system 224, such as digital certificate server 112, database system 227, storage server 284, communication server 286, authentication server 229, or combinations thereof, may be part of or separate of customer transaction system 105.

Figure 10:
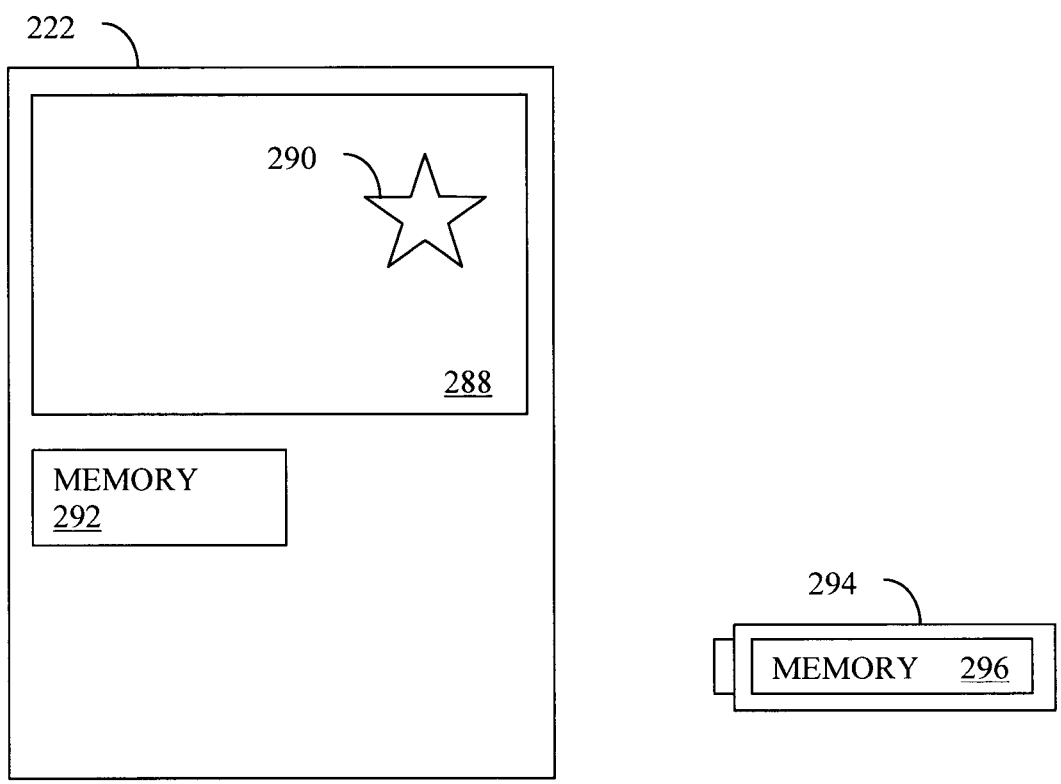
FIG. 10 is a block diagram of a mobile device and an external memory device to store an encrypted file.

FIG. 10 is a block diagram of mobile device 222 and an external device 294 to store the encrypted file. Mobile device 222 may include components, such as, but is not limited to, an input/output portion 288 and memory 292. Input/output portion 288 may be a display and may contain an icon 290. External device 294 includes memory 296 and is able to connect, either physically or wirelessly, with mobile device 222.

In the embodiment of FIG. 10, the login information sent from customer transaction system 105 to certification system 224 may include at least mobile device identification. The certification system 224 may then incorporate the mobile device identification into the encrypted file issued to customer 221. Mobile device identification may be an identification that identifies mobile device 222 and may be unique to mobile device 222, such as, but is not limited to, mobile device's 222 telephone number, electronic serial number, or any equivalent unique identification.

Furthermore, when the encrypted file is stored in a computer-readable medium in the embodiment of FIG. 10, the encrypted file may be stored in a computer-readable medium of external device 294, i.e., memory 296. When mobile device 222 attempts to connect to customer transaction system 105, the encrypted file may be sent to digital certificate server 112 from external device 294 via mobile device 222 to digital certificate server 112.

When digital certificate server 112 receives the encrypted file, digital certificate server 112 may also acquire mobile data unique to mobile device 222 that corresponds to the mobile device identification that may be part of the encrypted file. Upon decrypting the encrypted file, authentication server 229 may extract the mobile device identification and compare it to the acquired mobile data unique to mobile device 222 to ensure that the encrypted file was sent from the appropriate mobile device 222. In this manner, if mobile device 222 or external device 294 is lost, customer 221 is protected from a third party accessing the customer's account.

In an exemplary embodiment reflecting FIG. 10, customer 221 provides the electronic serial number (ESN) of mobile device 222 to customer transaction system 105. Customer transaction system 105 sends the ESN to the certificate system 224 where the ESN is stored in database system 227.

Mobile device 222 is then issued a digital certificate 124 from digital certificate server 112. However, when the executable file is run on mobile device 222, the encrypted file is stored in the memory of an external device 294 connected to mobile device 222.

For customer 221 to connect mobile device 222 to customer transaction system 105, customer 221 must be in possession of both mobile device 222 and the external device 294. When customer 221 desires to connect mobile device 222 to customer transaction system 105, customer 221 connects the external device 294 to mobile device 222 and then selects link 290. Mobile device 22 connects to digital certificate server 112 and sends the encrypted file from the external device 294. Upon receiving the encrypted file, certification system 224 acquires the ESN of mobile device 222.

Digital certificate server 112 decrypts the encrypted file and authentication server 229 authenticates the login information included therein. Additionally, authentication server 229 compares the acquired ESN of mobile device 222 with the stored ESN stored in database system 227. Certification system 224 does not continue the login process with customer transaction system 105 unless the acquired ESN is properly authenticated.

Figure 11:
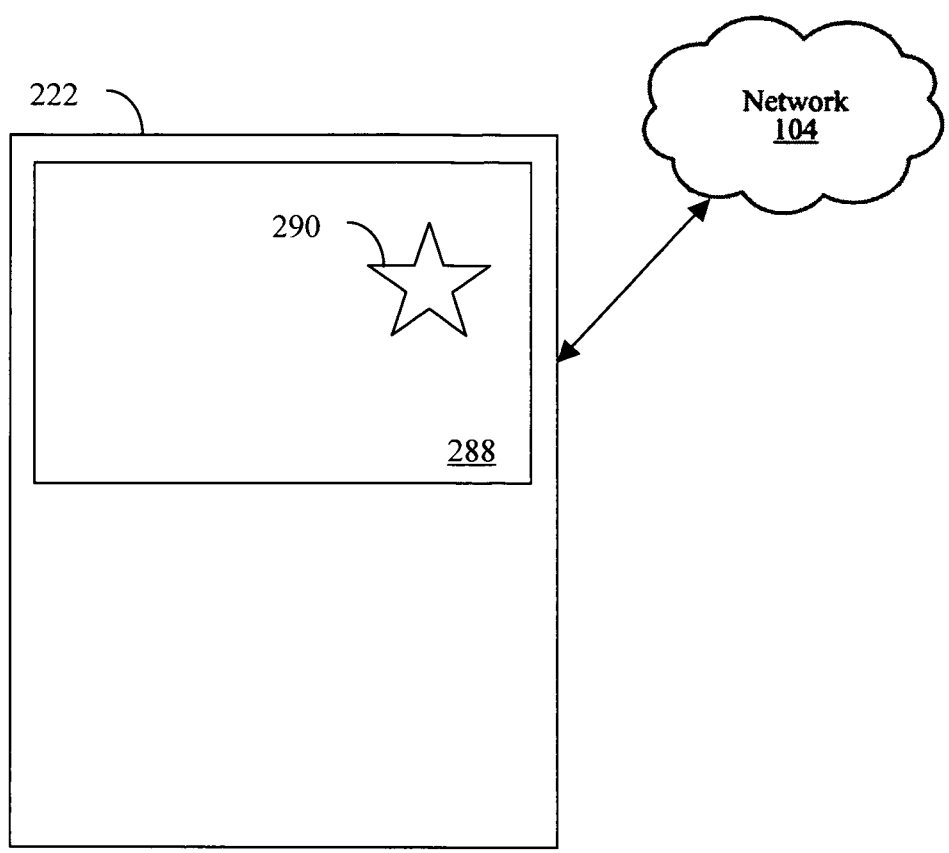
FIG. 11 is a block diagram of a mobile device and a network to store an encrypted file.

In another exemplary embodiment depicted in FIG. 11, the encrypted file may be stored in a memory location on network 104. In this embodiment, customer 221 may use any mobile device 222 with a link or icon 290 to attempt to access customer transaction system 105. When attempting to login in this manner, customer 221 would have to identify the location of the stored encrypted file on the network.

Figure 12:
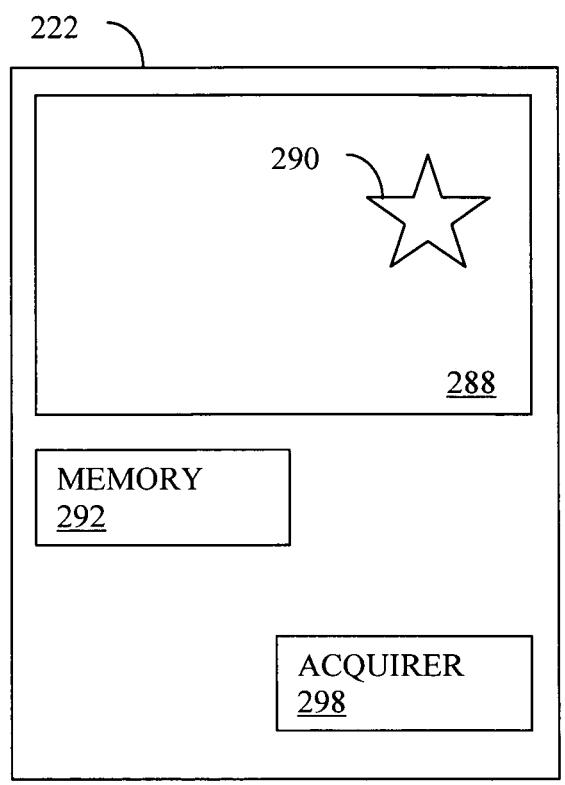
FIG. 12 is a block diagram of a mobile device adapted to acquire biometric data.

FIG. 12 is a block diagram of mobile device 222 that may be adapted to acquire biometric data. Mobile device 222 may include components, such as, but is not limited to, input/output portion 288, memory 292, and a biometric data acquirer 298. Biometric data acquirer 298 may be used to acquire biometric information used to uniquely identify customer 221 and may include, but is not limited to, a camera, finger print scanner, iris scanner, skin scanner, or any other equivalent device to acquire biometric information.

In the embodiment of FIG. 12, the login information sent from the customer transaction system 105 to certification system 224 may include at least biometric identification data for customer 221. The certification system 224 may then store the biometric identification data in database system 227 and incorporate the biometric identification data into the encrypted file created by digital certificate server 112 and issued to customer 221.

When mobile device 222 attempts to connect to transaction customer transaction system 105, customer 221 may be required to submit biometric data via biometric data acquirer 298. The acquired biometric data may be sent to digital certificate server 112 in addition to the encrypted file containing the login information. Upon receiving the biometric data and the encrypted file from mobile device 222, digital certificate server 112 decrypts the encrypted file, extracts the biometric identification data from the login information and authentication server 229 references it to the biometric data acquired by biometric data acquirer 298. In this manner, mobile device 222 is protected from third parties accessing the customer's account if mobile device 222 is lost or stolen.

In an exemplary embodiment reflecting FIG. 12, customer 221 provides a fingerprint to customer transaction system 105 as part of the registration process. Customer transaction system 105 sends the fingerprint to the certificate system 224 where an electronic version of the fingerprint is stored in database system 227.

Mobile device 222 is then issued a digital certificate 124 from digital certificate server 112 as previously described.

For customer 221 to connect mobile device 222 to customer transaction system 105, customer 221 selects link 290. Mobile device 222 connects to digital certificate server 112, sends the encrypted file from memory 292 and requires customer 221 to submit a fingerprint using biometric data acquirer 298. In this embodiment, biometric data acquirer 298 is a finger print scanner. Biometric data acquirer 298 scans the customer's fingerprint and mobile device 222 sends the scanned finger print to digital certification server 112. The scanned finger print may be sent as an encrypted file using a public key issued to mobile device 222 from digital certificate server 112.

Digital certificate server 112 decrypts the encrypted file and authentication server 229 authenticates the login information included therein as previously described above. Additionally, authentication server 229 authenticates the received fingerprint from mobile device 222 by referencing the stored fingerprint stored in database system 227. Certification system 224 does not continue the login process with customer transaction system 105 as described above until the received fingerprint is properly authenticated.

Figure 13:
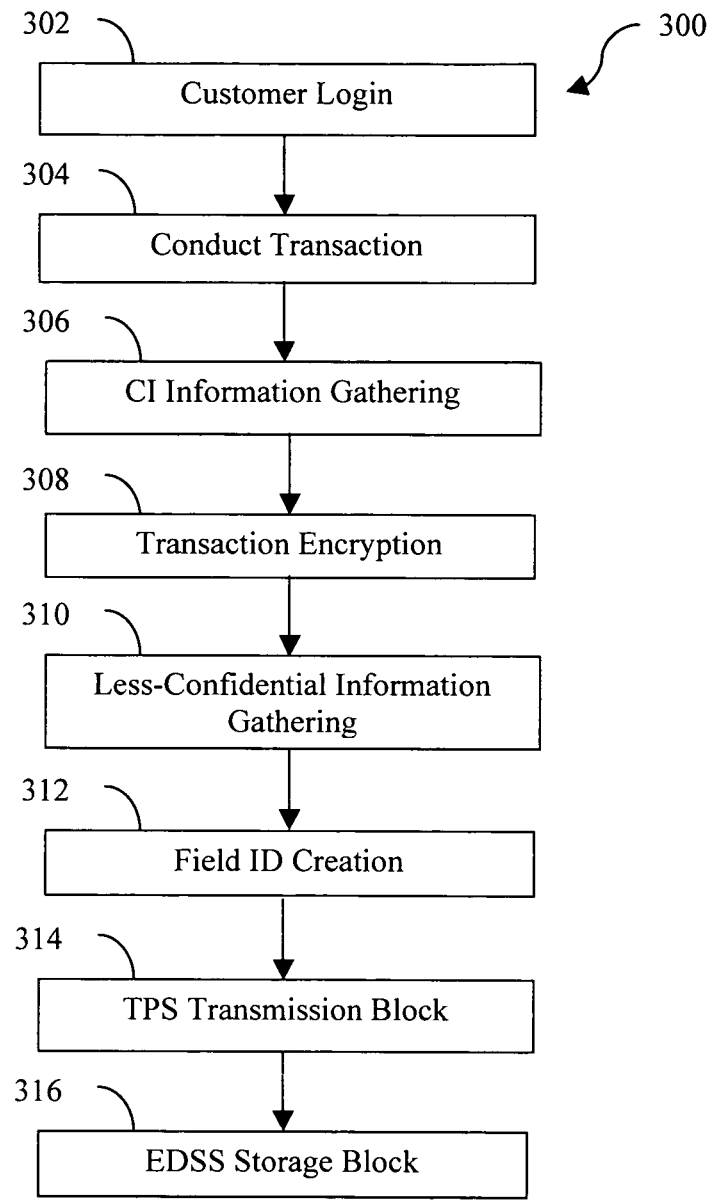
FIG. 13 is a flowchart illustrating a method of completing a transaction and the creation of an encrypted transaction file and a file ID.

FIG. 13 shows flowchart 300 illustrating a method of completing a transaction, including a customer login block 302, a conduct transaction block 304, a confidential information gathering block 306, a transaction encryption block 308, a less-confidential information gathering block 310, a file ID creation block 312, a transaction processing system (TPS) transmission block 314, and an encrypted data storage server (EDSS) storage block 316.

In customer login block 302, customer 221 may log into transaction processing system 106, for example through the transaction website, using customer ID card 118. For example, customer 221 may be able to click on, right click and select, and/or drag-and-drop, an icon associated with customer ID card 118 that establishes a link between customer workstation 102 and transaction processing system 106. Transaction processing system 106 may be configured to uniquely, or practically uniquely, associate customer workstation 102 with customer ID card 118, such as in infocard, as known to those having skill in the art. In an alternative embodiment, customer 221 may log into transaction processing system 106 using a mobile device 222 and certification system 224.

In conduct transaction block 304, customer 221 conducts a transaction in a manner known in the art that may depend upon the purpose or business of the particular transaction processing system 106. For example, customer 221 may use an electronic shopping cart to select items to be purchased. In confidential information gathering block 306, customer 221 and/or the transaction processing system 106 may provide confidential information that may be associated with the transaction conducted and/or payment for the transaction conducted. Confidential information may include, for example but not limited to, credit card numbers, zip codes, street addresses, card codes, transaction amounts, transaction item identifiers, receipts, registration information, a subset of registration information, vendor ID, transaction identifiers, etc. Confidential information may be provided using secured socket layer (SSL) encryption. At the time of the transaction, confidential information may be provided to third parties, such as credit card processors.

In transaction encryption block 308, the confidential information of block 306 is encrypted to create encrypted transaction file 120. For example, the confidential information of block 306 may be encrypted using a digital certificate public key associated with digital certificate 124 to create encrypted transaction file 120. In less-confidential information gathering block 310, more benign information, in comparison to the confidential information, may be gathered and/or gleaned from information sources. For example, but not limited to, the customer's first name, middle name, last name, business name, email address, the transaction date, the transaction time, the transaction amount, transaction confirmation number, etc., may be gathered from customer ID card 118, the confidential information, login information, and/or specific data entries provided by customer 221 at customer workstation 102 or mobile device 222.

In file ID creation block 312, the file ID 122 is created that uniquely, or practically uniquely, links to the encrypted transaction file 120. Filed ID 122 is also linked, as illustrated by link 130, to a less-confidential data file 128. File ID 22 may be a 22-digit alpha numeric string. The less-confidential data file 128 may be a file or data entry that includes the less-confidential information gathered in block 310.

In TPS transmission block 314, file ID 122 and the less-confidential data file 128 may be transmitted to the transaction processing system 106. In EDSS storage block 316, encrypted transaction file 120 is stored in the encrypted data storage server 114.

Figure 14:
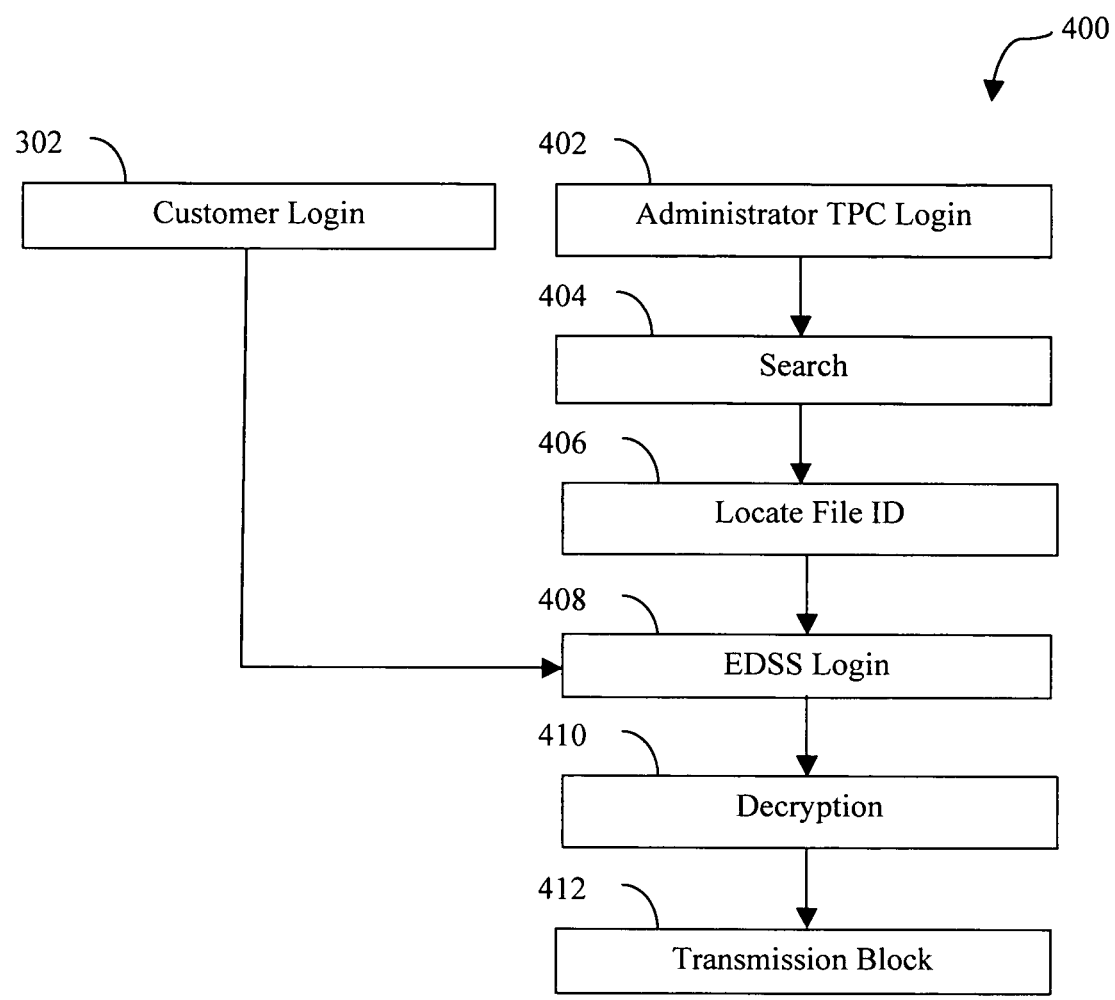
FIG. 14 is a flowchart illustrating a method of allowing a customer and/or an administrator access to the encrypted transaction file under limited circumstances and/or conditions.

FIG. 14 shows flowchart 400 illustrating a method of allowing an administrator and/or access to the encrypted transaction file 120, including an administrator TPC login block 402, a search block 404, a file ID 122 location block 406, an EDSS login block 408, a decryption block 410, and a secured data transmission block 412.

In administrator TPC login block 402, an administrator may log onto the transaction processing system using an administrator ID card 126. Administrator ID card 126 may be created in a manner similar to that illustrated in FIG. 2 for the creation of the customer ID card 118, using administrator registration information. The administrator registration information used to create the administrator ID card 126 may or may not include confidential information associated with the administrator. Access to encrypted transaction file 120 may also be initiated by customer 221 after a customer login 302 as previously described in regard to flowchart 300 of FIG. 13.

In search block 404, the administrator may search for file ID 122 in the transaction processing system 106. For example, the administrator may search a data base of a plurality of less-confidential information files, including less-confidential data file 128. In file ID 122 location block 406, the administrator may identify a particular file ID 122 associated with a particular transaction from the plurality of file IDs associated with a respective plurality of transactions. For example, the administrator may identify a desired file ID 122, from a plurality of additional file ID's (not shown), due to link 130 established between less-confidential data file 128 and file ID 122.

In EDSS login block 408, the administrator may log into the Encrypted Data Storage Server 114. The administrator may use Administrator ID card 126 to log into the Encrypted Data Storage Server 114. In decryption block 410, the administrator may decrypt the encrypted transaction file 120 using file ID 12 identified in block 406, and the associated private key from digital certificate 124. In secured data transmission block 412, the administrator may transmit the confidential information decrypted from the encrypted transaction file, for example, via secured email server 108.

The functionality, operations and architecture depicted in the figures may be implemented using modules, segments, and/or portions of software and/or firmware code. The modules, segments, and/or portions of code include one or more executable instructions for implementing the specified logical function(s). In some implementations, the functions noted in the blocks may occur in a different order than that showing in FIG. 2, FIG. 4-FIG. 6, and FIG. 13-FIG. 14. For example, two blocks shown in succession in FIG. 2, FIG. 4-FIG. 6, and FIG. 13-FIG. 14 may be executed concurrently or the blocks may sometimes be executed in another order, depending upon the functionality involved.

Those of skill will further appreciate that the various illustrative functional blocks, modules, circuits, and steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying was for each particular application, but such implementation decisions should not be interpreted as causing a departure from the scope of the appended claims.

The various illustrative functional blocks, modules, and circuits disclosed herein may be implemented or performed with a general purpose processor, a digital signal processor (DSP), and application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors or DSPs, one or more microprocessors in conjunction with a DSP core, or any other such configuration.

Software/firmware implementing any of the functions, blocks or processes disclosed herein may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and storage medium may reside in an ASIC.

If implemented in software, the methods, blocks, algorithms, and functions described herein may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), cellular technology, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A secure storage system that can be accessed from a mobile device, comprising:
    a secured processing system including an encryption data server to create an encrypted login information using a public key and private key for encryption and decryption associated with a digital certificate;
    a certification server for receiving the encrypted login information from a mobile device;
    a customer transaction system in communication with said certification server and the encryption data server, wherein said mobile device transmits said encrypted file to said certification server to securely log into said customer transaction system, and wherein said encrypted login information includes a first login information and wherein said customer transaction system includes an authentication system to authenticate said first login information to login said mobile device and wherein the customer transaction system includes a database system having a second login information and in communication with a authentication system using the certificate server where a certificate revocation list can be used to verify the second login information.

2. The secure storage system of claim 1, wherein said certification server transmits said encrypted login file to said customer transaction system to allow said mobile device to securely log into said customer transaction system.

3. The secure storage system of claim 1, wherein said customer transaction system includes said certification server.

4. The secure storage system of claim 1, wherein customer transaction system includes a customer account being accessible by said mobile device.

5. The secure storage system of claim 1, wherein said secure storage system is located within said mobile device.

6. The secure storage system of claim 1, wherein said secure storage system is located outside the said mobile device.

7. The secure storage system of claim 1, wherein every certificate issued and revoked is included in a certificate revocation list.

8. The secure storage system of claim 7, wherein a revoked certificate is included in the certificate revocation list.

9. The secure storage system of claim 7, wherein a canceled certificate is included in the certification revocation list.

10. The secure storage system of claim 1, wherein said secure storage system is a computer-readable medium.

11. A method for login adapted to a mobile device, comprising the steps of:
    storing an encrypted file on an encryption data server in a storage system;
    transmitting said encrypted file from the encryption data server on said storage system to a certification system on a certification server; and
    logging in said mobile device into the certification server of a customer transaction system, and wherein said encrypted file includes a first login information and wherein said customer transaction system includes an authentication system to authenticate said first login information to login said mobile device and wherein the customer transaction system includes a database system having a second login information and in communication with a authentication system using the digital certificate server where a certificate revocation list can be used to verify the second login information.

12. The method of claim 11, wherein the transmitting step includes transmitting said encrypted file from said storage system to said certification system via said mobile device.

13. The method of claim 11, further including a step of creating said encrypted file having login information.

14. The method of claim 11, further including a step of storing said login information in a database.

15. The method of claim 11, further including a step of transmitting said login information from said certification system.

16. The method of claim 11, further including a step of authenticating said certificate associated with said encrypted file.

17. The method of claim 11, further including a step of issuing a digital certificate from said certification system to said mobile device.

* * * * *